Patented June 19, 1923.

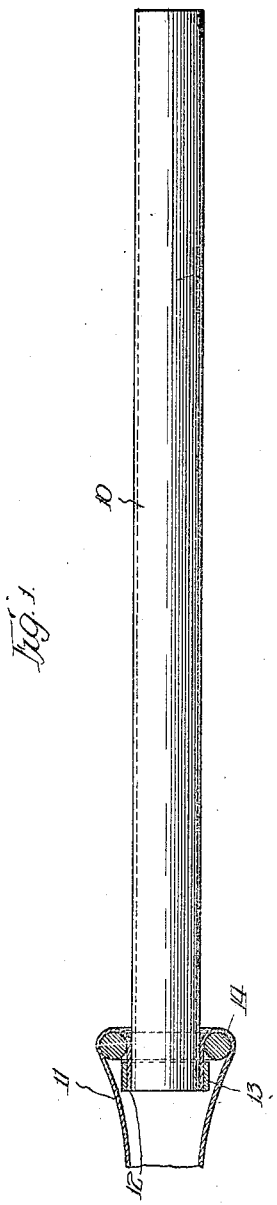
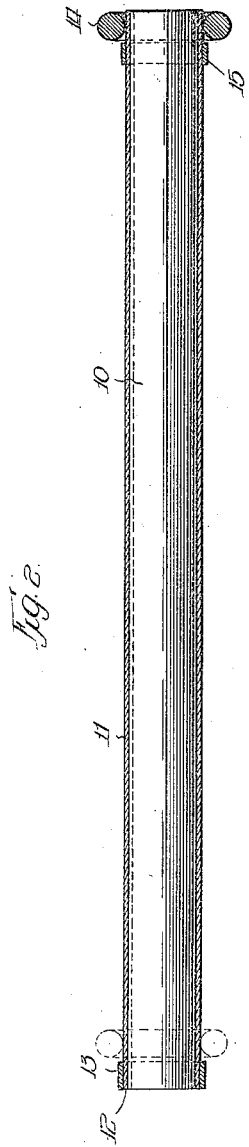
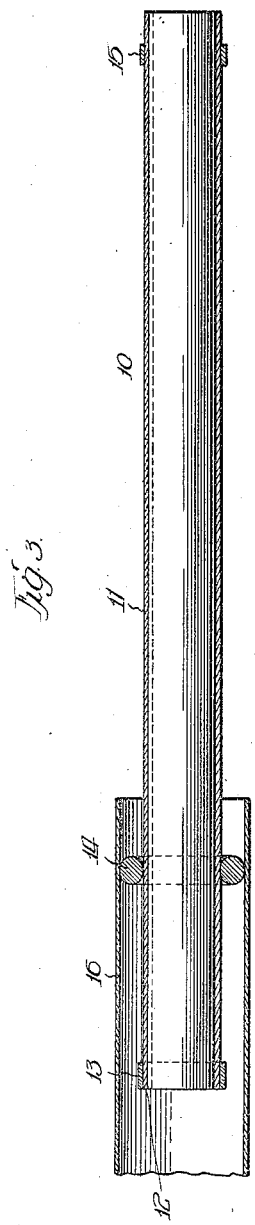

1,459,244

UNITED STATES PATENT OFFICE.

JOHN F. PALMER, OF ST. JOSEPH, MICHIGAN.

MEANS FOR MAKING PNEUMATIC TIRES.

Application filed April 8, 1920. Serial No. 372,126.

*To all whom it may concern:*

Be it known that I, JOHN F. PALMER, a citizen of the United States, residing at St. Joseph, in the county of Berrien and State of Michigan, have invented certain new and useful Improvements in Means for Making Pneumatic Tires, of which the following is a specification.

This invention relates to a method of and means for making pneumatic tires.

One object of my invention is to reduce the time and expense in manufacturing air tubes for pneumatic tires and the like, whether made entirely of rubber or rubber reinforced with a fabric, such as knit or woven yarn or cord.

Another object is to provide a simple and efficient method for making air tubes for pneumatic tires in a manner to reduce the cost of manufacturing and at the same time meet all of the commercial requirements.

Another object is to provide simple and novel means for practicing my invention.

These and other objects are accomplished by means of the mechanism and method disclosed on the accompanying sheet of drawings, in which—

Figure 1 is a side elevation of a hollow mandrel to which one end of an air tube is tightly taped and doubled back upon itself with my yieldable rolling tool in position to roll or apply the air tube to the mandrel in a manner to exclude all air intermediate the mandrel and said tube, the air tube, tape and rolling tube being shown in section;

Figure 2 is a side elevation of the same mandrel with the air tube applied along the length thereof, the rolling tool being shown at the opposite end of the mandrel after its working movement, the initial position of the rolling tool being indicated by dotted lines at the left-hand side of the mandrel. In this figure the air tube, binding tape and rolling tool are shown in section; and, Figure 3 is a view similar to that shown in Figure 2, but in addition showing an outer cylinder between which and the mandrel the rolling tool is compressed for applying the air tube and preventing air from passing between the mandrel and air tube, or for expelling any such air, the outer tube also being used for actuating the rollable tool.

The various novel features of my invention will be apparent from the following description and drawings and will be particularly pointed out in the appended claims.

The common practice in making air tubes today involves the following steps: The making of the raw tube and mounting it upon a mandrel, then wrapping this tube down tigthly on the mandrel to expel air from between the mandrel and tube, and also cause direct contact under pressure between the two, then vulcanizing the tube in open steam, then unwinding the wrapper and removing the tube from the mandrel, and then turning the tube inside out.

I have discovered that if the air is removed from between the rubber air tube and the mandrel and it is vulcanized in that condition, the pressure of the atmosphere or steam during vulcanization is quite sufficient to properly compact it and smooth the inner surface to equal that of the mandrel against which it is pressed.

To accomplish the thorough expulsion of the air from under the structure, I secure one end of the rubber tube to the mandrel by airtight wrapping of frictional tape or the like, and roll the tube onto the mandrel without permitting air to pass between the mandrel and rubber air tube in the operation, or if there is any air between such parts, to roll the air out by the use in both cases of a constrictive rubber ring adapted to roll easily on its own circular axis, such as described and claimed in my copending application Serial No. 223,557, filed March 20, 1918, the rubber ring or tool being rolled slowly and evenly from one end of the tube to the other when the second end of the air tube is wrapped with tape before the ring is rolled off the end of the tube. The rubber air tube is then vulcanized without any wrapping being placed thereon, after which the rubber tube is rolled off of the mandrel over the rollable ring or tool in a manner reverse to that used in placing the tube on the mandrel. This completes the process when no reinforcement of cord or fabric is desired. If reinforcing of the tube is desired, a knit fabric of cotton or cord is drawn over the tube, and to obtain an intimate engagement of the rubber tube and the fabric and to expel the air from between the same and filling the interstices of the fabric with rubber of the tube, I wet the cord or other fabric with a rubber solvent with or without rubber in it, such as gasoline, or heat and soften the rubber by admitting steam to the interior of the mandrel, and thereupon again roll the constrictive rubber ring tool from end to end of the tube as before. Additional pressure may be applied by pushing the mandrel carrying the tube, fabric and ring through a metal tube, the bore of which is a predetermined amount smaller than the outside diameter of the ring as it lays on the mandrel, thus adding the resistance to compression to the already operative force of the constrictive tension in the ring. It is thus obvious that a controllable pressure is available within the wide limits for the expulsion of air, and at the same time ample for combining the rubber or fabric, either by driving the cord into the rubber or squeezing the rubber up into the interstices of the fabric. The progressive encircling pressure of the ring as it advances along the tube will be analogous to that of a calender driving a wave of softened rubber ahead of it from one end of the tube to the other, thus working the fabric as well as expelling all air from the structure. I then apply another tube of rubber outside the fabric, binding the ends and rolling it down with a ring, as before, whereupon the structure is ready for vulcanization and removal from the mandrel in the manner described.

Referring to the figures of the drawings, it will be noted that I have shown a hollow mandrel 10, upon which a cylindrical rubber air tube 11 may be applied. In applying this rubber air tube to the mandrel, one end 12 is first placed over the mandrel and is tightly secured thereto by suitable tape 13 in a manner to prevent any air entering between the mandrel and the air tube. My rubber or resilient tool 14, as described in my above mentioned copending application, is applied over one end of the rubber air tube and between the folds thereof, as shown in Figure 1, whereupon the rollable tool 14 is caused to roll about its circular axis toward the right-hand end of the mandrel for applying the full length of the air tube 11 thereon. In doing so all air is either excluded from entering between, or is forced out from between the rubber air tube and the mandrel. At the end of this operation the parts are arranged as shown in Figure 2 of the drawings, whereupon the right-hand end of the tube is tightly wrapped to the mandrel to prevent the admission of air between the tube and mandrel. The rollable tool 14, in which the stresses are practically balanced, is then rolled over the right-hand end wrapping 15, whereupon the rubber air tube is vulcanized, this being done without any wrapping being applied over the rubber air tube. The rubber air tube, after being vulcanized, may be withdrawn from the mandrel by placing the rollable tool 14 thereon, withdrawing tapes 13 and 15, and rolling the air tube off over the rollable tool 14, the parts then being in the relative positions shown in Figure 1 of the drawings. If desired, the rollable element 14 may be actuated back and forth over the rubber tube on the mandrel by an outer cylinder 16, preferably of metal, for increasing the force exerted by the rollable element, as mentioned hereinabove. If it is desired to reinforce the air tube by fabric of any kind, the same may be done by a repetition of the method directly hereinabove set forth, one layer of fabric being placed over the inner rubber tube by means of the rollable member 14 and then a second rubber tube being placed over the layer of fabric, whereupon the complete structure is vulcanized preparatory to being withdrawn from the mandrel.

It is my intention to cover all modifications of the invention as set forth in the following claims.

I claim:

1. In combination, a mandrel over which a tube may be placed, and a freely rollable ring member for compacting tube structures on said mandrel.

2. In combination, a mandrel, and a rollable ring for applying tube structures thereto and excluding air from between said tube and mandrel.

3. In combination, a mandrel over which a tube member may be placed, and a rollable ring over which the tube member may be removed from said mandrel.

4. In combination, a mandrel over which rubber and fabric tubes may be mounted, and a rollable compressible ring for working fabrics thereon.

5. In combination, a mandrel for receiving tubular material, and a rollable compressible constrictive ring for applying progressive pressure to the tubular material.

6. In combination, a mandrel for receiving tubular material, and a rollable constrictive resilient ring by means of which the tubular material may be pressed against the mandrel by pressure incident to the rolling of said ring over the tubular material.

Signed at Chicago, Illinois, this 30th day of March, 1920.

JOHN F. PALMER.